United States Patent
Ochiai et al.

(10) Patent No.: US 8,659,252 B2
(45) Date of Patent: Feb. 25, 2014

(54) ELECTRIC POWER STEERING APPARATUS

(75) Inventors: Takayuki Ochiai, Maebashi (JP);
Mikihiko Tsunoda, Maebashi (JP);
Naoki Sawada, Maebashi (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 13/265,050

(22) PCT Filed: Sep. 20, 2011

(86) PCT No.: PCT/JP2011/005286
§ 371 (c)(1),
(2), (4) Date: Oct. 18, 2011

(87) PCT Pub. No.: WO2012/073412
PCT Pub. Date: Jun. 7, 2012

(65) Prior Publication Data
US 2013/0257337 A1    Oct. 3, 2013

(30) Foreign Application Priority Data
Dec. 2, 2010  (JP) .................................. 2010-269161

(51) Int. Cl.
*H02P 7/00*    (2006.01)

(52) U.S. Cl.
USPC ........... 318/432; 318/293; 318/489; 318/444; 318/588; 318/446; 701/41; 701/42; 701/43; 399/38; 399/167; 361/23

(58) Field of Classification Search
USPC ................. 318/432, 446, 293, 489, 444, 588; 701/41, 42, 43; 180/79.1, 132, 444, 180/446; 399/38, 167; 361/23
See application file for complete search history.

(56) References Cited

U.S. PATENT DOCUMENTS

| 5,445,237 | A | * | 8/1995 | Eda et al. ....................... 180/444 |
| 6,329,735 | B1 | | 12/2001 | Tanaka et al. |
| 2009/0133955 | A1 | | 5/2009 | Morikawa et al. |
| 2009/0250287 | A1 | | 10/2009 | Takashima et al. |
| 2009/0267430 | A1 | * | 10/2009 | Imamura et al. ................ 310/71 |
| 2009/0295325 | A1 | | 12/2009 | Sekine et al. |

FOREIGN PATENT DOCUMENTS

| JP | 2000-500102 A | 1/2000 |
| JP | 2001-506558 A | 5/2001 |
| JP | 3559193 B2 | 5/2004 |
| JP | 2004-182079 A | 7/2004 |

(Continued)

OTHER PUBLICATIONS

Japanese-language Office Action dated Jun. 18, 2013 with English translation (Four (4) pages).

(Continued)

*Primary Examiner* — Eduardo Colon Santana
*Assistant Examiner* — Jorge Carrasquillo
(74) *Attorney, Agent, or Firm* — Crowell & Moring LLP

(57) ABSTRACT

An electric motor and a control unit are juxtaposed in a speed reduction gear box. A terminal block is provided at an outer circumference of a flange proximate to a control unit of the electric motor. Terminal block surfaces of the terminal block are provided so that a plane direction faces a direction vertical to a shaft line of the electric motor. A motor side connecting terminal is held on the terminal block surface. The unit side connecting terminals provided at a position proximate to the electric motor of the control unit are arranged so as to overlap with the motor side connecting terminal on the terminal block surface to couple by a coupling portion (fixing screw).

11 Claims, 9 Drawing Sheets

(56) References Cited

FOREIGN PATENT DOCUMENTS

| | | | |
|---|---|---|---|
| JP | 2008-254655 A | | 10/2008 |
| JP | 2009-132174 A | | 6/2009 |
| JP | 2009132174 A | * | 6/2009 |
| JP | 2009-184492 A | | 8/2009 |
| JP | 2009-248754 A | | 10/2009 |
| JP | 2009248754 A | * | 10/2009 |
| JP | 2009-280018 A | | 12/2009 |
| JP | 2010-100217 A | | 5/2010 |
| JP | 2010-143473 A | | 7/2010 |
| WO | WO 98/10971 | | 3/1998 |
| WO | WO 98/26972 | | 6/1998 |

OTHER PUBLICATIONS

English-language translation of the International Search Report dated Dec. 27, 2011 (Two (2) pages).

English translation of International Preliminary Report on Patentability (PCT/IB/373) and Written Opinion (PCT/ISA/237) (Six (6) pages).

Japanese-language International Search Report (Form PCT/ISA/210) dated Dec. 27, 2011 (two (2) pages).

Japanese-language International Preliminary Report (Form PCT/ISA/237) dated Dec. 27, 2011 (four (4) pages).

* cited by examiner

ELECTRIC POWER STEERING APPARATUS

FIELD OF THE INVENTION

The present invention relates to a mechatronically-integrated electric power steering apparatus in which an electric motor and a control unit for driving the electric motor are juxtaposed.

BACKGROUND ART

As an electric power steering apparatus, it is well known e.g. as disclosed in Patent Document 1 a mechatronically-integrated electric power steering apparatus in which a control unit is mounted on a speed reduction gear box and the control unit drives an electric motor based on detected steering torque information and transmits via a worm speed reduction mechanism a steering assist force generated by the electronic motor to a steering system. The electric power steering apparatus disclosed in Patent Document 1 is designed to connect a motor side connecting terminal facing a control unit side connecting terminal, providing a gap to the control unit side connecting terminal, to a substrate side connecting terminal, while elastically deforming the motor side connecting terminal and absorbing the gap, when connecting the motor side connecting terminal of the electric motor with the control unit side connecting terminal of the control unit.

As an electric motor use for in the mechatronically-integrated electric power steering apparatus, it is known e.g. an electric motor with brush as disclosed in Patent Document 2.

An electric motor disclosed in Patent Document 2 is an electric motor with brush having floating construction, which includes a cylindrical yoke, a magnet arranged opposing to each other in the yoke, a shaft rotatably arranged on a central shaft line of the yoke, an armature secure to the shaft, a commuter secured to one end of the shaft, a brash abutted to a surface of the commuter, a brash holder holding the brash, a housing attached to the yoke, and an elastic body interposed between the brash holder and the housing and having the housing holding the brash holder. The electric motor is configured to block a pathway through which vibration generated when the armature rotates is transmitted from the commuter, the brash, the brash holder, and the housing by means of the elastic body interposed between the brash holder and the housing.

PRIOR ART DOCUMENT

Patent Document 1

Patent Document 1: JP 2008-254655 A
Patent Document 2: JP 3559193

SUMMARY OF THE INVENTION

Problem to be Solved

It is feared, however, that when the electric motor with brush having the floating construction disclosed in Patent Document 2 is applied as an electric motor of the electric power steering apparatus disclosed in Patent Document 1, one may experience an increased operating sound attributable to the electric motor.

That is, elastically deforming the motor side connecting terminal toward the control unit side connecting terminal as disclosed in Patent Document 1, the elastic body floatingly holding the brash holder of the electric motor with brash is brought into s state where the elastic body is recessed and lurched. This aggravates a connecting state between the commuter and the brash, which is liable to suffer from an increased operating sound spring from the electric motor with brash.

The present invention is made by focusing on the above-indicated problems remained unsolved thus far immanent in the prior art, and its objective is to provide an electric power steering apparatus able to connect the motor side connecting terminal with the control unit side connecting terminal, while reducing the operating sound caused by the motor, even if the electric motor with brush having the floating construction is adopted.

Solution to the Problem

To accomplish the above-indicated objective, an electric power steering apparatus according to one embodiment comprises a steering column in which a steering shaft through which steering torque is transmitted is installed, and an electric motor to transmit via a speed reducer in a speed reduction gear box a steering assist force to the steering shaft, wherein the electric motor and a control unit to drive the electric motor are juxtaposed in the speed reduction gear box; a terminal block is provided at an outer circumference of a flange proximate to the control unit of the electric motor, a terminal box surface of the terminal block being provided so that a plane direction faces a direction vertical to an axis line of the electric motor, the motor side connecting terminal of the electric terminal being held on the terminal block surface; the unit side connecting terminal provided at a position proximate to the electric motor of the control unit is arranged so as to overlap with the motor side connecting terminal on the terminal block surface; and the unit side connecting terminal and the motor side connecting terminal are coupled at a coupling portion.

According to one embodiment of the electric power steering apparatus, the motor side connecting terminal of the electric motor is not subject to an external force other than a direction vertical to an shaft line of the electric motor when the motor side connecting terminal is connected to the unit side connecting terminal of the control unit. On that account, it achieves little lurching of the brash holder holding the brash, thus reducing motor operating noises spring from a brash contacting part, even if the electric motor with brash having the floating construction.

Further since the motor side connecting terminal and the unit side connecting terminal outwardly protrude less amount from the flange of the electric motor as they are arranged overlapped, it allows compactification of the electric power steering apparatus.

According to one embodiment of the electric power steering the motor electric motor and the control unit are arranged on the speed reduction gear box in series in an axial direction of the electric motor.

Furthermore, according to one embodiment of the electric power steering apparatus, the coupling portion couples the unit side connecting terminal and the motor side connecting terminal from an axial direction of the steering column.

According to one embodiment of the electric power steering apparatus, it facilitates a coupling work of the unit side connecting terminal and the motor side connecting terminal.

According to one embodiment of the electric power steering apparatus, the motor side connecting terminal is provided with a bent portion at a side proximate to the control unit.

According to one embodiment of the electric power steering apparatus, it facilitates following to displacement caused by vibration after connection of the motor side connecting terminal and the unit side connecting terminal, and contraction and expansion caused by heat.

The electric power steering apparatus according to one embodiment of the present invention, the motor side connecting terminal is provided with a rising slope so as to apart from the terminal block surface, as the motor side connecting terminal goes from the bent portion toward a terminal tip.

According to one embodiment of the electric power steering apparatus, since when the unit side connecting terminal of the control unit moves to toward the terminal block surface of the terminal block, the motor side connecting terminal imparts elastic backlash to the unit side connecting terminal while elastically deforming to the terminal block surface side, it improves adhesiveness between the unit side connecting terminal and the motor side connecting terminal.

The electric power steering apparatus according to one embodiment of the present invention, the coupling portion is a fixing screw for fastening to the terminal block together with unit side connecting terminal and the motor side connecting terminal from a direction vertical to a shaft line of the electric motor.

According to one embodiment of the electric power steering apparatus, an external force is only applied to the motor side connecting terminal in a direction vertical to a shaft line of the electric motor, even fastening the unit side connecting terminal and the motor side connecting terminal by the fixing screw. Thus, even adopting the electric motor with brash having the floating construction, it nevertheless enables reduction of motor operating noises.

The electric power steering apparatus according to one embodiment of the present invention, further comprises a speed reduction gear box fixing screw to fix the control unit to the speed reduction gear box, the speed reduction gear box fixing screw extending in the same direction as the fixing screw to be mashed with the unit side connecting terminal.

According to one embodiment of the electric power steering apparatus, it permits an efficient assembly work.

The electric power steering apparatus according to one embodiment of the present invention, the coupling portion is solder welding to bond the unit side connecting terminal and the motor side connecting terminal to the terminal block.

According to one embodiment of the electric power steering apparatus, because a work can be done while arranging the welding tool such that the tool extends along a shaft line of the electric motor, it provides good welding activity.

The electric power steering apparatus according to one embodiment of the present invention, a set of the overlapped unit side connecting terminal and the motor side connecting terminal is arranged multiple adjacent to one another, and a solder splash preventing wall to prevent splash of solder is provided between the adjacent set.

According to one embodiment of the electric power steering apparatus, it precludes a possibility of conducting solder between the set of the overlapped unit side connecting terminal and the motor side connecting terminal during a welding work.

The electric power steering apparatus according to one embodiment of the present invention, a terminal holder holding the unit side connecting terminal is provided at a position proximate to the electric motor of the control unit, one fixing concave and convex being provided at a position facing the electric motor of the terminal holder; the other fixing concave and convex are provided on the terminal block of the electric motor proximate to the terminal holder; and when the one fixing concave and fixing convex of the terminal holder and the other fixing concave and convex of the terminal block are engaged, the unit side connecting terminal overlaps with the motor side connecting terminal.

According to one embodiment of the electric power steering apparatus, it facilitates an assembly work of the unit side connecting terminal and the motor side connecting terminal.

The electric power steering apparatus according to one embodiment of the present invention, a guide wall is provided on the terminal block to guide the unit side connecting terminal in a direction in which the unit side connecting terminal overlaps with the top of the motor side connecting terminal.

According to one embodiment of the electric power steering apparatus, it facilitates an overlap operation of the motor side connecting terminal and the motor side connecting terminal.

The electric power steering apparatus according to one embodiment of the present invention, a terminal cover covering around the unit side connecting terminal and the motor side connecting terminal is detachably provided on the terminal block.

According to one embodiment of the electric power steering apparatus, it preludes a possibility of occurring an electrical short circuit in the motor side connecting terminal of the electric motor, despite of production of conductive foreign objects therearound.

The electric power steering apparatus according to one embodiment of the present invention, the terminal cover slidably moves, while being engaged with the terminal block, to a position covering around the unit side connecting terminal and the motor side connecting terminal from an outer circumference of the electric motor apart from the control unit.

According to one embodiment of the electric power steering apparatus, it facilitates attachment of the terminal cover.

Advantageous Effect of the Invention

According to the electric power steering apparatus according to the present invention, the present invention takes a construction in which the unit side connecting terminal provided at a position proximate to the electric motor of the control unit is coupled to the motor side connecting terminal in such a manner of overlapping with the motor side connecting terminal on a terminal block surface. The motor side connecting terminal does not experience an external force other than a direction orthogonal to a shaft line of the electric motor when the motor side connecting terminal is connected to the unit side connecting terminal. For this reason, even if an electric motor with brash having a floating construction is adopted, it nevertheless is allowed to decrease lurching of the brash holder holding the brash, and reduce motor operating noises caused by a brash contact.

Further, because the motor side connecting terminal and the unit side connecting terminal are connected overlapped, the amount protruding outward from a flange of the electric motor is made smaller, which enables compactification of the electric power steering apparatus.

DESCRIPTION OF EMBODIMENTS

Hereinafter, an explanation will be made in detail to the best mod (hereafter, referred to as an embodiment) for carrying out the present invention with reference to the accompanying drawings.

Figure 1:
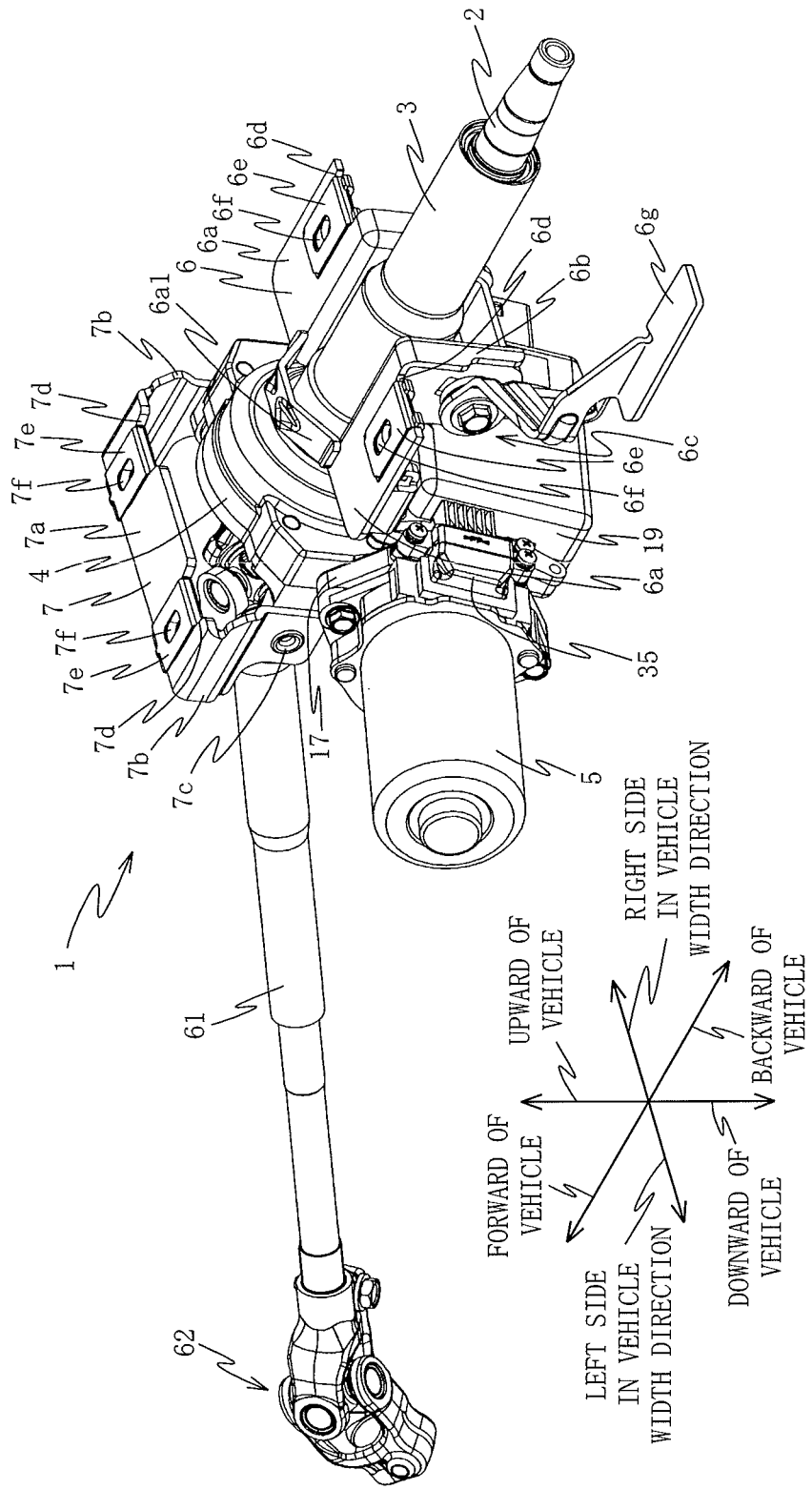
FIG. 1 is a perspective view showing, seen from the left, a case where one embodiment of an electric power steering apparatus according to the present invention is applied to a right-hand drive car.
Figure 2:
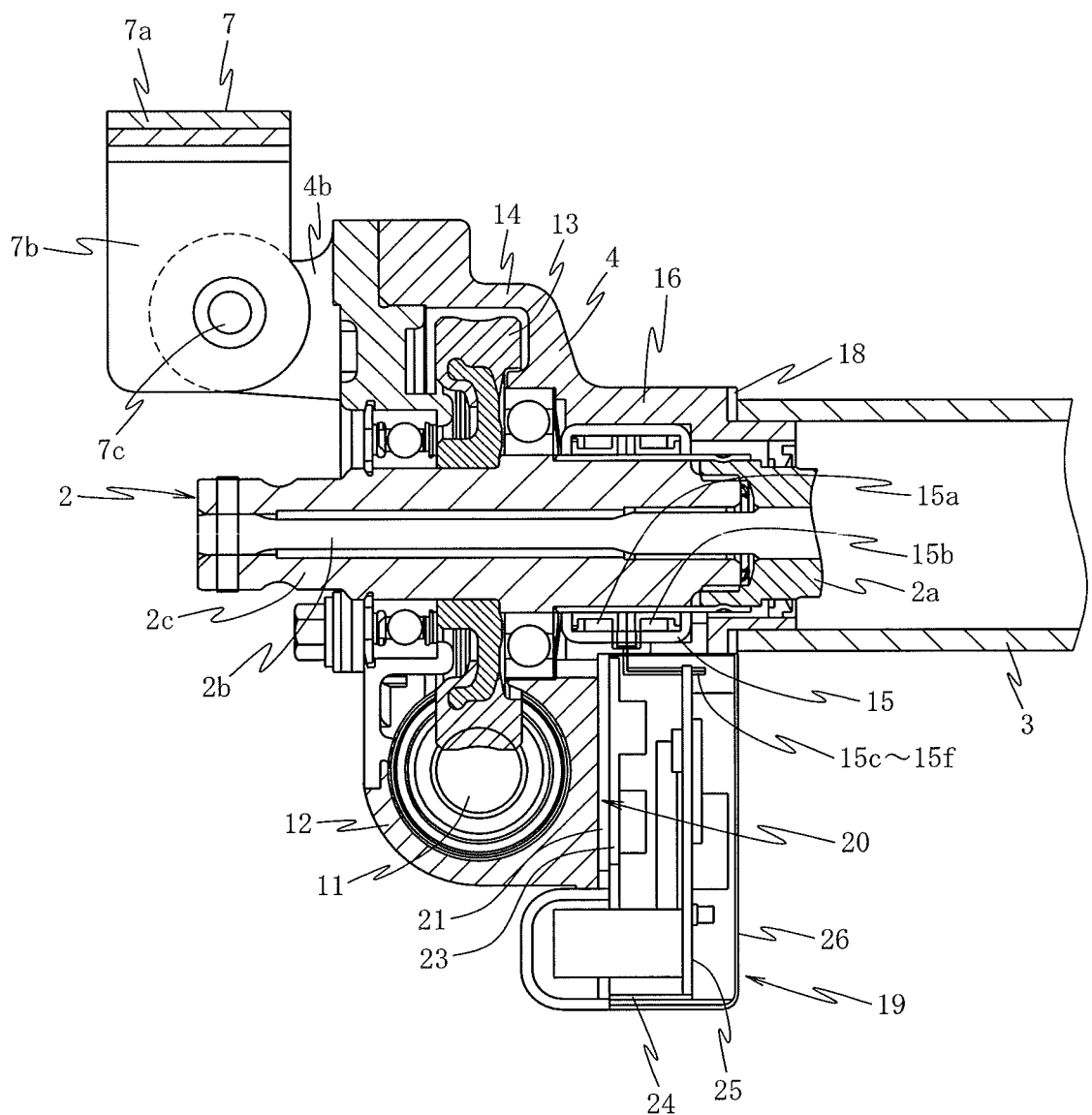
FIG. 2 is a longitudinal cross-sectional view showing a principal part of an electric power steering apparatus.

FIG. 1 is a perspective view showing, seen from a driver's side, an electric power steering apparatus of a first embodiment according to the present invention. FIG. 2 is a longitudinal perspective view showing a principal part of the electric power steering apparatus.

Herein, reference numeral 1 in FIGS. 1 and 2 denotes a column-type electric power steering apparatus, where a speed reduction gear box 4 is linked to a steering column 3 in which a steering shaft 2 coupled to a steering wheel (not shown) is installed therein, and an electric motor 5 configured of a brushless motor and a control unit 19 are arranged to the speed reduction gear box 4 in a direction in which its axial direction is orthogonal to that of the steering column 3.

One end of a lower shaft 61 is linked via a universal joint 60 to the steering shaft 2, and a pinion shaft (not shown) is linked via a universal joint 62 to the other end of the lower shaft 61.

The steering column 3 and the speed reduction gear box 4 are mounted on a car body side with an upper mounting bracket 6 and a lower mounting bracket 7.

The lower mounting bracket 7 is composed of a mounting plate 7a, and a pair of support plate 7b extending in parallel at predetermined intervals in a crosswise direction from an underside of the mounting plate 7a. An lower end of the support plate 7b is rotatably linked via a pivot 7c to a support 4b (see FIG. 3) integrally provided at the forward side of a vehicle of the speed reduction gear box 4. Further, a slit 7d is formed in the mounting plate 7a and a desorption capsule 7a is fitted into the slit 7d. A bolt through hole 7f is formed in the desorption capsule 7a and the mounting plate 7a is mounted on a car side member (not shown) by screwing a fixing bolt (not shown) into the car side member, which is penetrating through the bolt through hole 7f, from downward of the desorption capsule 7a.

The upper mounting bracket 6 is provided with a pair of mounting plates 6a, a coupling plate 6a1 to couple the these pair of the mounting plates 6a, a pair of support plates 6b which is secured to an lower end of the pair of the mounting plates 6a and is part from each other in a lateral (vehicle width) direction, and a tilt mechanism 6c to support the steering column 3 provided at these pair of the support plates 6b. By rotating a tilt lever 6g of the tilt mechanism 6c to release a support state of the steering column 3, it enables the steering column 3 to be adjustable, upward and downward, with the pivot 7c of the lower mounting bracket 7 as the center. A slit 6d is formed in the pair of the mounting plates 6a, into which the desorption capsule 7a is being fitted. A bolt through hole 6f is formed in the desorption capsule 7a and the mounting plate 6a is mounted on the car side member by screwing the fixing bolt (not shown) penetrating through the bolt through hole 6f into the bolt through hole 6f, from the underside of the desorption capsule 7a.

The steering shaft 2, as shown in FIG. 2, is composed of an input shaft 2a of which upper end is joined to the steering wheel (not shown), and an output shaft 2c hanging over a torsion bar 2b coupled via a torsion bar 2b to a lower end of the input shaft 2a.

The speed reduction gear box 4 is made e.g. by di-cast molding anyone of materials with high heat conductivity, such as aluminum, aluminum alloy, magnesium, and magnesium alloy.

The speed reduction gear box, as shown in FIG. 2, is provided with a worm housing 12 to house a worm 11 of a worm speed reducer coupled to the output shaft (Shaft 5c shown in FIG. 4) of the electric motor 5, a worm wheel housing 14 which has a central axis orthogonal to its central axis at an underside of the worm housing 12 and houses a worm wheel 13 to be meshed with the worm 11, a torque sensor housing 16 to house a torque sensor 15 integrally and coaxially coupled to the backward side of a vehicle of the worm wheel housing 14, a motor mounting part 17 (see FIG. 1) to mount the electric motor 5 provided at an open end face of the worm housing 12, a cylindrical column mounting part 18 provided at a rear end of the vehicle of the torque sensor housing 16, and a control unit mounting part 20 to mount a control unit 19 provided in a plane orthogonal to a central shaft line of the worm wheel housing 14 and the torque sensor housing 16, bridging over part of the worm housing 12 and the worm wheel housing 14. A vehicle front end of the steering column 3 is externally provided for coupling to a column mounting part 18 of the speed reduction gear box 4.

The torque sensor 15 is configured to magnetically detect a torsion state between the input shaft 2a and the output shaft 2c of the steering shaft 2 to detect steering torque transmitted to the steering shaft by means of a pair of the detection coils 15a,15b. External connecting terminals 15c to 15f outwardly protruding in parallel in a direction orthogonal to the central axis of the steering column 3 are respectively connected to a winding start and a winding end of these pair of the detection coils 15a,15b, and a projection of these external connecting terminals 15c to 15f are bent in L-shaped form in parallel with the steering column 3 at the center of these external connecting terminals 15c to 15f.

The control unit 19 to be mounted on the control unit mounting part 20 of the speed reduction gear box 4, as shown in FIG. 2, is provided with a metal heat discharging plate 21 with high heat conductivity, a power substrate 23, a rectangular frame-shaped synthetic resin frame 24, a control substrate 25, and a cover 26.

The cover 26 is fixed by screwing four fixing screws 50 (see FIG. 3) into the control unit mounting part 20 from the backward side of a vehicle while covering the power substrate 23, the synthetic resin frame 24, and the control substrate 25.

The heat discharging plate 21 is directly fixed though thermal grease to a flat mounting surface of the control unit mounting part 20.

Discrete parts (not shown) are mounted on the power substrate 23, including such as a H-bridge circuit configured of a power switching transistor such as a field-effect transistor for driving the electric motor 5, and a pulse modulation circuit for driving a power switching element of the H-bridge circuit.

The synthetic resin frame 24 surrounds the power substrate 23. The control substrate 25 is attached to the front of the synthetic resin frame 24, on which a through hole (not shown) through which external connecting terminals 15c to 15f of the torque sensor 15 directly penetrates is drilled. A steering assist current command is calculated based on a torque detection value supplied from the torque sensor 15 and a vehicle speed detection value supplied from a vehicle speed sensor (not shown) and a voltage command to the pulse width modulation circuit of the power substrate 23 is calculated by performing current feedback control based on the steering assist current command and a detection value of a motor current to be output to the electric motor 5. This realizes implementation of a MCU (Micro Control Unit) to control the steering assist force generated by the electric motor 5 and discrete parts 25e such as its peripheral equipments.

Figure 3:
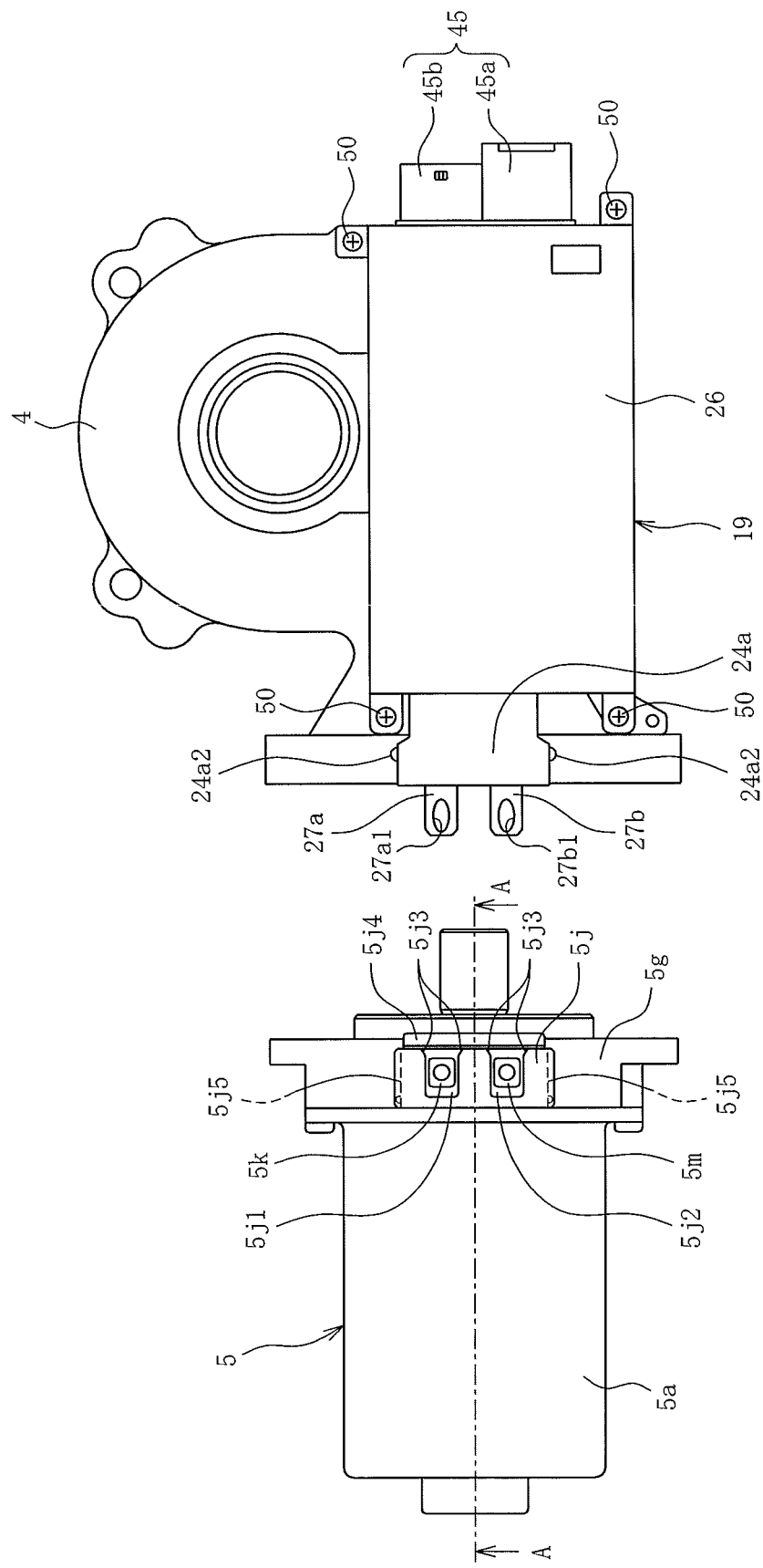
FIG. 3 is a view showing a situation where a control unit mounted on a speed reduction gear box is separated from an electric motor.

The control unit 19 mounted on the control unit mounting part 20 of the speed reduction gear box 4, as shown in FIG. 3, is provided with a terminal holder 24a provided protrudingly on the left side of the synthetic resin frame 24, and a female connector 45 provided protrudingly on the right side of the synthetic resin frame 24.

The unit side connecting terminals 27a,27b to be connected to the motor side connecting terminals 5k,6m of the electric motor 5 described later protrudes from the terminal holder 24a substantially in parallel toward the left side of FIG. 3. Slot-like screw holes 27a1,27b1 are formed in these unit side connecting terminals 27a,27b.

On the side in width direction of the terminal holder 24a, an engaging projection 24a2 is provided for engaging with a terminal cover 35 to be described later.

The female connector 45 is provided with a power connector 45a, and a signal connector 45b to connect to networks such as a CAN to carry out data exchange with each of control equipments of a vehicle body. The power substrate 23 and the control substrate 25 are connected via a connecting terminal 22a.

Figure 5:
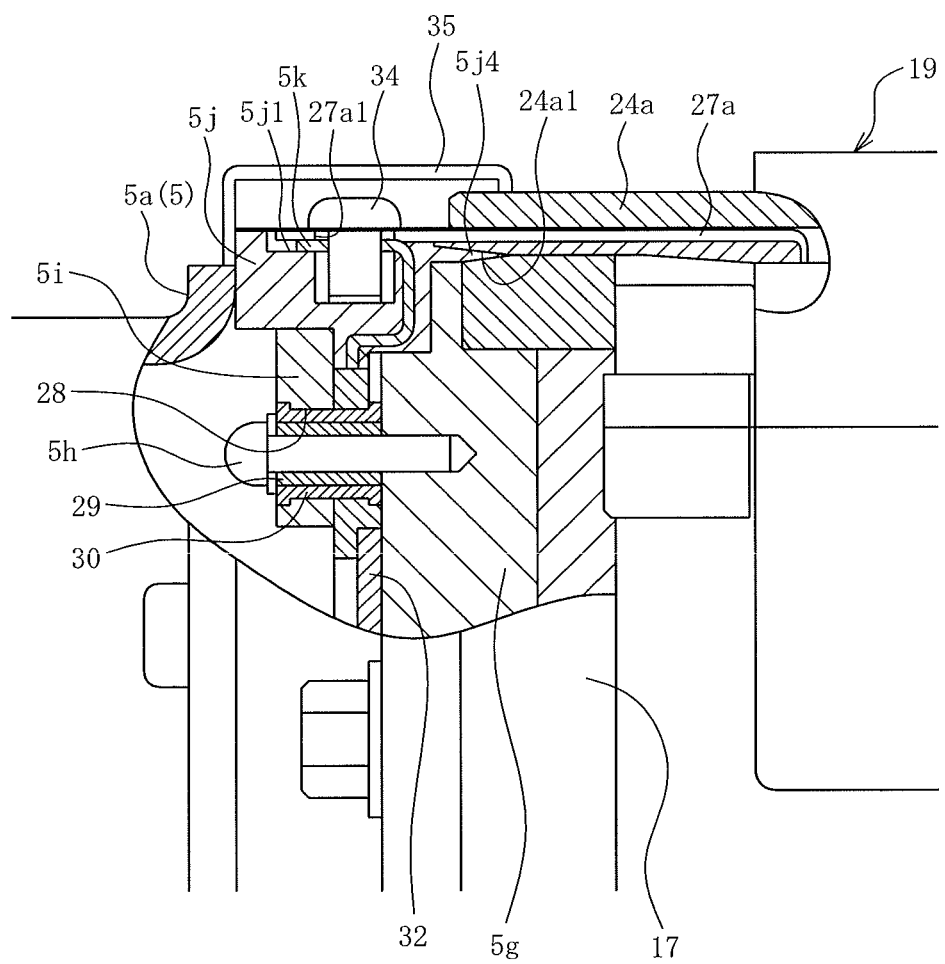
FIG. 5 is an enlarged view showing a connecting state between a unit side connecting terminal of a control unit and a motor connecting terminal of an electric motor.

Further, as shown in FIG. 5, a positioning concave 24a1 is formed in an end face of the terminal holder 24a facing toward a connecting direction of the electric motor 5.

Figure 4:
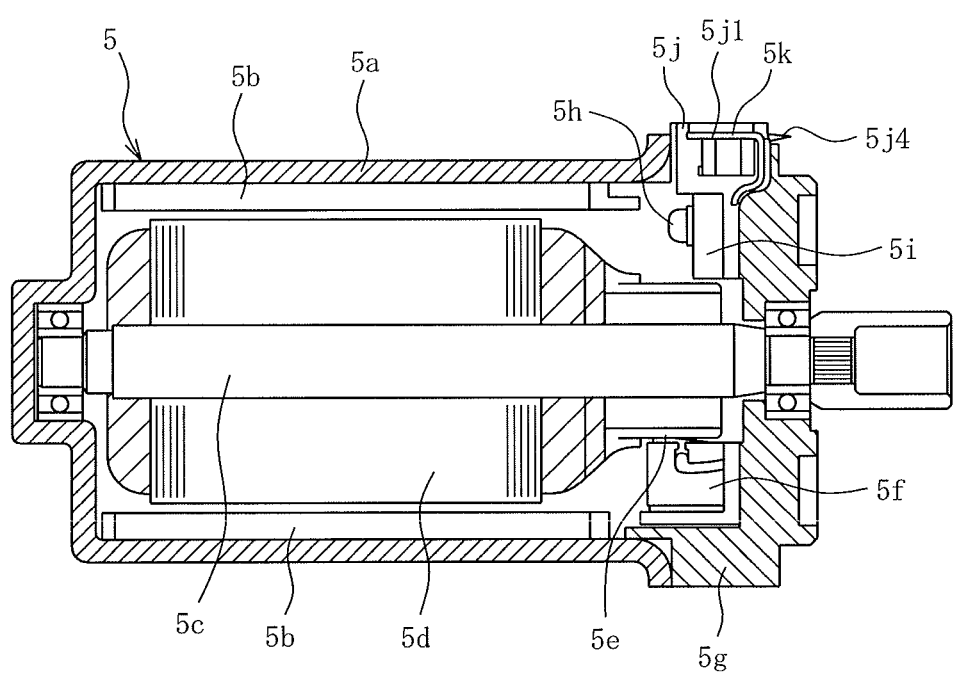
FIG. 4 is an arrow view taken along a line A-A of FIG. 3.

The electric motor 5, as shown in FIGS. 3 and 4, is an electric motor with brash including a cylindrical yoke 5a, plural magnets 5b disposed at predetermined intervals to an inner wall of the yoke 5a, a shaft 5c rotatably arranged on a central shaft line of the yoke 5a, an armature 5d secured to the shaft 5c, a commuter 5e secured to one end of the shaft 5c, a brash 5c abutting to a surface of the commuter 5e, a flange member 5g coupled to an opening of the yoke 5a, a synthetic resin brash holder 5i which is connected via a screw 5h to the flange member 5g and holds the brash 5f, a terminal block 5j provided at an outer circumference of the flange member 5g to which the terminal holder 24a of the control unit 19 is proximate and opposes, and motor side connecting terminals 5k,5m which are held by the terminal block 5j and to which the unit side connecting terminals 27a,27b of the control unit 19 are connected. A perfect circle-shaped screw hole is formed in the motor side connecting terminals 5k,5m.

Between the brash holder 51 and the flange member 5g, a ring-shaped gum sheet 32 is attached.

Further, as shown in FIG. 5, a cylindrical gum mount 30 is attached between a metal collar 29 arranged on an outer circumference of the screw 5h to the screw insertion hole 28 into which a screw 5h provided in the brash holder 5i is inserted. Thus, the ring-shaped gum sheet 32 attached between the gum mount 30, the brash holder 5i, and the flange member 5g blocks vibration generated at the brash side 5f, which implements an electric motor with brash having the floating construction 5.

The motor side connecting terminals 5k,5m are arranged in the brash holder 5i insulating from each other, which a part provided at one end of a pair of an arc conductor (not shown) individually connected to a plural set of brushes 5f.

The terminal block 5j, as shown in FIG. 3, is a substantially rectangular block body protruding from one end of an outer circumference of the flange member 5g, on an upper surface of which two terminal block surfaces spaced apart from each other in a circumferential direction facing a plane direction vertical to a shaft line of the electric motor 5. As shown in FIG. 5, the aforementioned motor side connecting terminals 5k,5m are arranged so as to be sandwiched by the unit side connecting terminals 27a,27b and the terminal blocks surfaces 5j1,5j2. The motor side connecting terminals 5k,5m are bent rectangularly toward the brash holder 5i shown in FIG. 4 and molded in the terminal block 5j by insert molding.

Around the terminal bock surfaces 5j1,5j2, a wall is risen only except for a direction facing a connecting direction of the control unit 19. The wall having a gateway near the connecting direction of the control unit 19 is provided as a guiding wall 5j3 to bring the unit side connecting terminals 27a,27b of the control unit 19 moved toward the terminal block surfaces 5j1,5j2 for guiding to the terminal block surfaces 5j1,5j2 side.

A positioning convex 5j4 protruding in a direction facing a connecting direction of the control unit 19 is provided in the terminal block 5j. As shown in FIG. 5, when the connecting convex 6j4 fits into a positioning concave 25a1 formed in the terminal holder 24a of the control unit 19, the unit side connecting terminals 27a,27b of the control unit 19 are configured to overlap with the top of the motor side connecting terminals 5k,5m arranged in the terminal block 5j.

Figure 6:
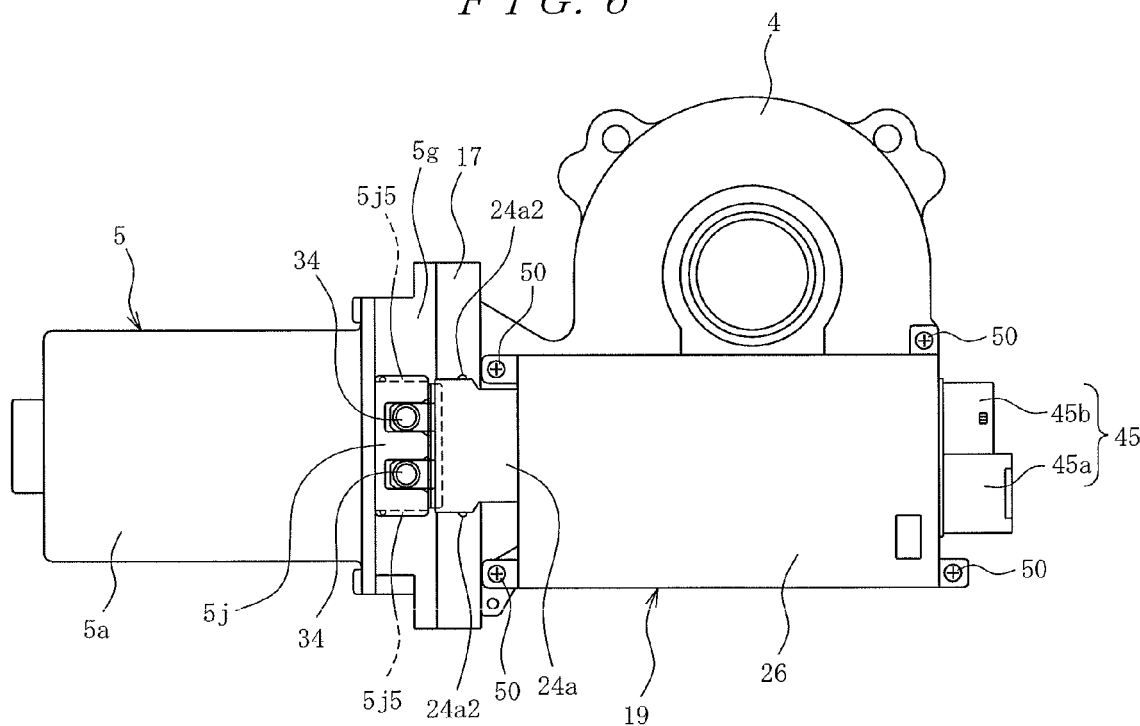
FIG. 6 is a view showing a connecting state between a control unit mounted on a speed reduction gear box and an electric motor.

The overlapped unit side connecting terminal 27a and the motor side connecting terminal 5k, and the unit side connecting terminal 27b and the unit side connecting terminal 5m, as shown in FIGS. 5 and 6, are connected by screwing a fixing screw 34 into the terminal block 5j from a direction vertical to a shaft line of the electric motor 5.

As shown in FIG. 6, when the flange member 5g of the electric motor 5 is abutted to the moor mounting part 17 of the speed reduction gear box 4, and the unit side connecting terminals 27a,27b of the control unit 19 and the motor side connecting terminals 5k,5m of the electric motor 5 are connected to one another, the terminal holder 24a of the control unit 19 and the terminal block 5j of the electric motor 5 are faced each other.

Herein, as shown in FIG. 6, on the side of the terminal block 6j positioned on a circumferential direction side of the flange member 5g, an engage groove 5j5 is formed, which linearly extends along a shaft line of the electric motor 5, and into which en end of a terminal cover 35 engages.

Figure 8:
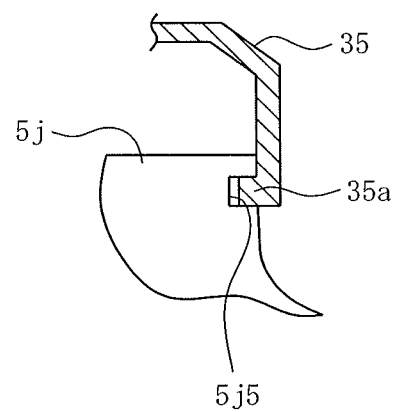
FIG. 8 is a cross-sectional view of a principal part illustrating how a terminal cover and a motor side connecting terminal are engaged with each other.

The terminal cover 35 is a box-like member of which lower part is opened allowing covering the entire terminal block 5j. As shown in FIG. 8, an engage convex 35a to be slidably engaged into an engage groove 5j5 formed in the terminal block 5j is formed at the rim of the opening.

Figure 7:
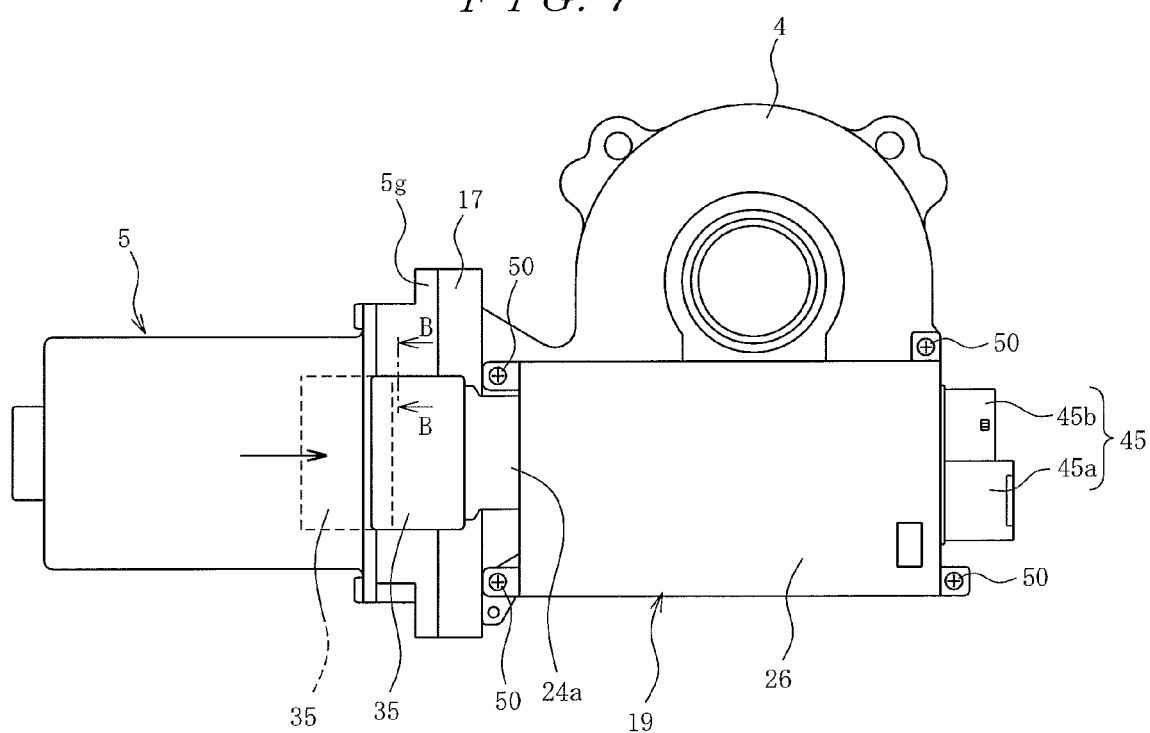
FIG. 7 is a view showing a state where a connecting position at which a unit side connecting side and a motor side connecting terminal are connected is covered by a terminal cover.

As shown in FIG. 7, when moving the terminal cover 35 of which engage convex 35a is engaged into the engage groove 5j5 formed in the terminal block 5j from a side apart from the terminal holder 24*a* of the control unit 19 toward the terminal holder 24*a*, the terminal cover 35 covers the motor side connecting terminals 5*k*,5*m* and the unit side connecting terminals 27*a*,27*b* connected with the terminal block 5*j*. Here, the terminal cover 35 moved toward the terminal holder 24*a* is attached in a state where part of the terminal holder 24*a* is covered by engaging an end of the engage convex 35*a* with the engage projection 24*a* provided on the side in a width direction of the terminal holder 24*a*.

Saying in addition, the positioning concave of the present invention corresponds to the positioning concave 24*a*1, the positioning convex of the present invention corresponds to the positioning convex 5*j*4, and the sped reduction gear box fixing screw corresponds to the fixing screw 50, respectively.

An explanation will then be made to an operation of the present embodiment.

When an ignition switch (not shown) of a vehicle is turned on to supply electricity from a buttery to the power substrate 23 and the control substrate 25, steering assist control processing is executed by the MCU (Micro Control Unit) and a steering assist current command is calculated based on detected values of the torque sensor 15 and the vehicle speed sensor (not shown). Based on a steering assist current command and a motor current detected by the motor current detection part, current feedback processing is executed to calculate a current command. By supplying the current command to a gate driving circuit of the power substrate 23 to control the H-bridge circuit, a motor driving current flows to the electric motor 5 for driving the electric motor 5 so as to generate a steering assist force necessary for the electric motor 5 to rotate in a normal direction or in a reverse direction.

On this account, the electric motor 5 generates a steering assist force depending on steering torque of the steering wheel, and the steering torque is transmitted to an output of the steering shaft 2 via the worm 11 and the worm wheel 13. This enables steering of the steering wheel with a light steering force.

An explanation will next be made to the effect and operation of the mechatronically-integrated electric power steering apparatus 1 according to the present embodiment.

The electric motor 5 of the present embodiment is an electric motor 5 with brash having a floating construction. When an external force is applied to the motor side connecting terminals 5*k*,5*m* to be connected to the unit side connecting terminals 27*a*,27*b* of the control unit 19, it is not a fear that a brash holder 5*i* lurches as the gum mount 30 and the gum sheet 32 deform arranged for the purposes of blocking vibration, which aggravates a connecting state between the commuter 5*e* and the brash 5*f*, resulting in increased operating noises.

Contrarily, in the electric motor 5 of the present embodiment, the terminal block 5*j* is provided on part of the outer circumference of the flange member 5*g*, and the terminal block surfaces 5*j*1,5*j*2 holding the motor side connecting terminals 5*k*,5*m* of the terminal block 5*j* are provided so that their plane direction faces in a direction vertical to a shaft line of the electric motor 5. The unit side connecting terminals 27*a*,27*b* of the control unit 19 are arranged overlappingly on the motor side connecting terminals 5*k*,5*m* on the terminal block surfaces 5*j*1,5*j*2, and the motor side connecting terminals 5*k*,5*m* and the unit side connecting terminals 27*a*,27*b* are connected by screwing the fixing screw 34 thereinto from a direction vertical to a shaft line of the electric motor 5. At this time, when the unit side connecting terminals 27*a*,27*b* extending from the control unit 19 are connected to the motor side connecting terminals 5*k*,5*m*, brash holder 5*i* does not cause lurching, as the gum mount 30 and the screw 5*h* are subject to a load vertically, even though the brash holder 5*i* experiences a pressing force in an axial direction due to fastening by the fixing screw 34.

Although a thrust force is applied to the motor side connecting terminals 5*k*,5*m* and the unit side connecting terminals 27*a*,27*b* connected by the fixing screw 34, it enables prevention of suffering from breakage to the motor side connecting terminals 5*k*,5*m* and the unit side connecting terminals 27*a*,27*b* during a connecting work, as the speed reduction gear box 4 is subject to the thrust force instead thereof.

Thereby, since this avoids the occurrence of lurching in the brash holder 5*i* when the motor side connecting terminals 5*k*,5*m* and the unit side connecting terminals 27*a*,27*b* are connected, it enables reduction of operating noises resulting from the electric motor 5 due to a connecting state between the armature 5*e* and the brash 5*f*.

Further, since the motor side connecting terminals 5*k*,5*m* are apt to bent in rectangular in a direction of the unit side connecting terminals 27*a*,27*b* and to absorb displacement of the terminal block surfaces 5*j*1,5*j*2 and the brash holder 5*i*, it is designed to facilitate following to displacement caused by vibration of the both terminals after connection, and contraction and expansion caused by heat.

Because the motor side connecting terminals 5*k*,5*m* and the unit side connecting terminals 27*a*,27*b* has only to connect by the fixing screw 34 from a direction perpendicular to a shaft line of the electric motor 5, it may facilitate a connecting work.

Since the fixing screws 34 and 50 are provided in an axial direction of the steering column 3 and a fixing work is done from the backward side of a vehicle, and further the all the fixing screws 34 and 50 can be fixed from the same direction, it allows an efficient assembly operation of the control unit 19.

Moreover, since, on account of overlapping connection of the motor side connecting terminals 5*k*,5*m* and the unit side connecting terminals 27*a*,27*b* in a shaft line direction of the electric motor 5, an electrical coupling portion thereof is set to protrude outwardly less amount from the flange member 5*g* of the electric motor 5, it allows promoting compactification of the electric power steering apparatus 1.

The positioning convex 24*a*1 is provided to the terminal holder 24*a* proximate to the electric motor 5 of the control unit 19 mounted on the speed reduction gear box 4, and the positioning convex 5*j*4 is provided to the terminal block 5*j* of the electric motor 5 proximate to the terminal holder 24*a*. Additionally, when the positioning convex 5*j*4 is fitted into the poisoning concave 24*a*1, the unit side connecting terminal 27*a*,27*b* of the control unit 19 are adapted to overlap on the top of the motor side connecting terminals 5*k*,5*m* on the terminal block 5*j*. However, it facilitates a connecting operation of the control unit 19 and the electric motor 5.

A guide wall 5*j*3 is provided on the terminal block 5*j* of the electric motor 5, which contacts with the unit side connecting terminals 27*a*,27*b* of the control unit 19 guide them so as to be going toward the motor side connecting terminals 5*k*,5*m*, it facilitates an overlap operation of the unit side connecting terminals 27*a*,27*b* on the motor side connecting terminals 5*k*,5*m*.

Further, since slot-shaped screw holes 27*a*1,28*b*1 are formed in the unit side connecting terminals 27*a*,27*b* and is configured to screw the fixing screw 34 in correspondence with a perfect circle-shaped screw hole of the motor side connecting terminals 5,5*m* by changing a position in a major axis direction of these screw holes 27*a*,27*b*, it may absorb dimensional dispersion of the electric motor 5 and the control unit 19 in a direction along a shaft line direction of the electric motor 5.

Moreover, engaging the engage convex 35a formed in the rim of the opening of the terminal cover 36 into the engage groove 5j5 formed in the side of the terminal block 5j and moving the terminal cover 36 toward the control unit 19 enables covering the unit side connecting terminals 27a,27b of the control unit 19 and the motor side connecting terminals 5k,5m of the electric motor 5 connected to each other. Thus, it precludes a possibility of occurring an electrical short circuit in the motor side connecting terminals 5k,5m of the electric motor 5, despite of production of conductive foreign objects therearound, and facilitates attachment of the terminal cover 36.

Figure 9:
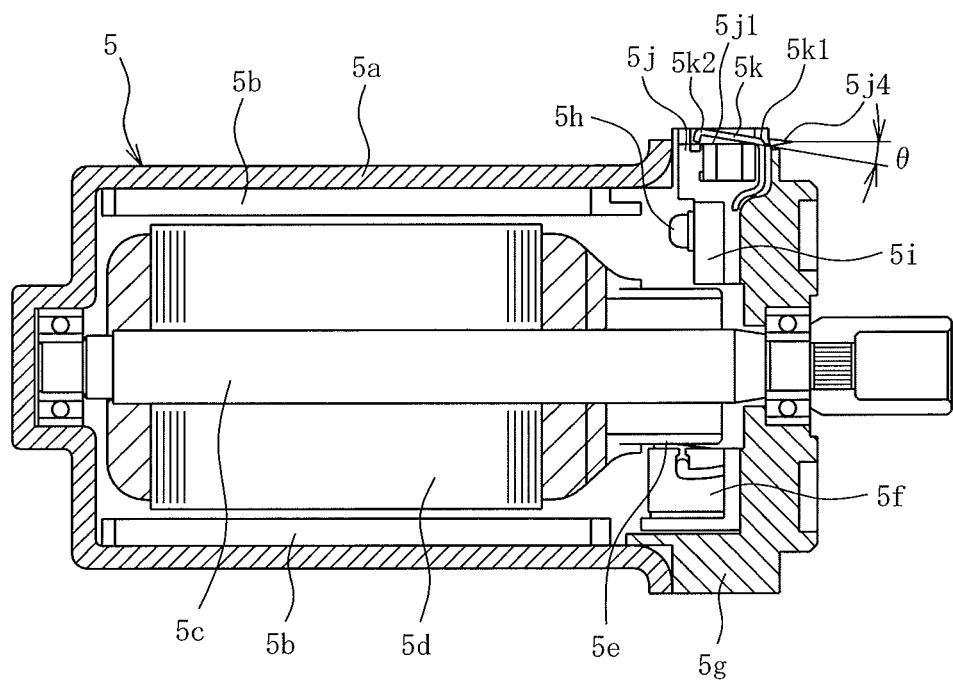
FIG. 9 is a cross sectional view showing a construction of a second embodiment according to the present invention.

Shown in FIG. 9 is the electric motor 5 of a second embodiment according to the present invention. Hereupon, the same components as those shown in FIGS. 3 and 4 are designated by the same reference numeral, and description thereof is omitted for brevity's sake.

The electric motor 5 of the present embodiment is arranged inclined at a predetermined angle θ with respect to the terminal block surface 5j1 of the terminal block 5j provided toward a plane direction in a direction vertical to a shaft line of the electric motor 5.

The motor side connecting terminal 5k is provided with a bent portion 5k1 at a rectangular portion of the side proximate to the control unit 19, which is formed with a rising slope from the bent portion 5k toward the point 5k2 1 so as to flexible.

As such construction, the motor side connecting terminal 5k which is inclined with respect to the terminal block surface 5j1 of the terminal block 5j with a rising slop from the side proximate to the control unit toward the point 5k2 19 imparts an elastic backlash to the unit side connecting terminal 27a, as elastically deforming to the terminal block surface 5j1 side, when the unit side connecting terminal 27 of the control unit 19 moves toward the terminal block surface 5j1 for fixing by the fixing screw 24. This improves adhesiveness with the unit side connecting terminal 27a. Accordingly, it has the advantage of improving reliability of an electrical connecting state between the motor side connecting terminal 5k and the unit side connecting terminal 27a, as well as preventing looseness of the fixing screw 34.

While in FIG. 9, an explanation was made to the construction of one motor side connecting terminal 5k and the connecting state with the unit side connecting terminal 27a of the control unit 19, the other motor side connecting terminal 5m has the same construction.

Figure 10A:
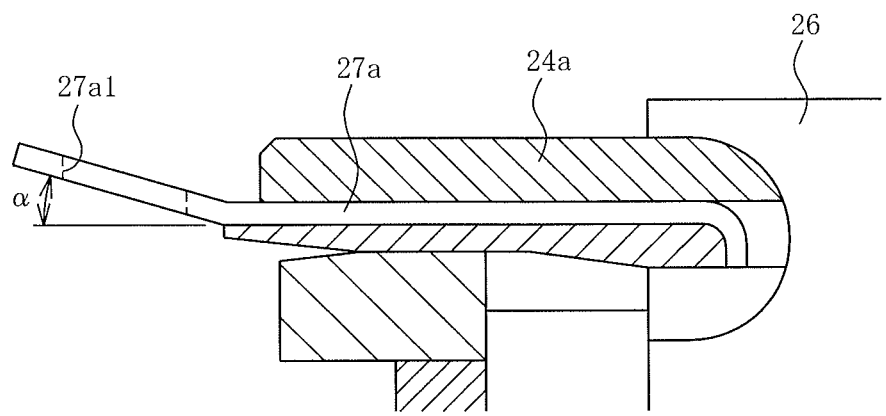
FIG. 10 is a view showing a principal part of a third embodiment according to the present invention.
Figure 10B:
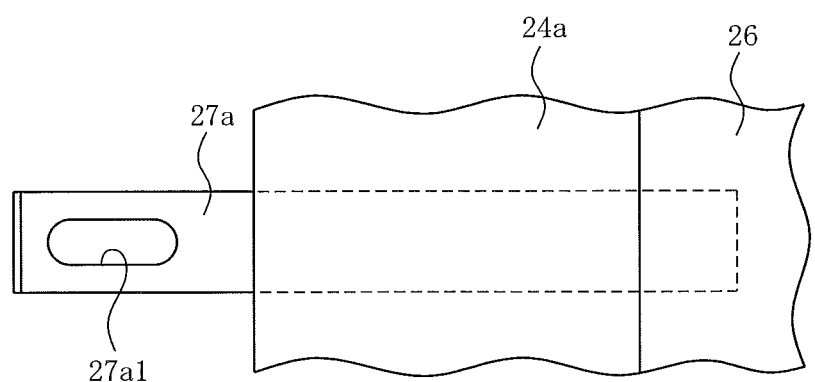

Shown in FIG. 10 is the unit side connecting terminal 27a of the control unit 19 of a third embodiment according to the present embodiment.

In the present embodiment, the point forming the screw hole 27a1 of the unit side connecting terminal 27a is formed with a rising slop at a predetermined angle α with respect to the proximal end side embedded in the terminal holder 24a so as to flexible.

When the point of the unit side connecting terminal 27a with a rising slop having the above construction is fixed by the fixing screw 34 in a contact state with motor side connecting terminal 5k, it allows looseness of the fixing screw 34 as an elastic backlash is applied in a direction apart from the motor side connecting terminal 5k.

While in FIG. 10, an explanation was made to the construction of one unit side connecting terminal 27b, the other unit side connecting terminal 27b has the same construction.

Alternatively, even adopting either the construction of the motor side connecting terminals 5k,5m shown in FIG. 9 and that of the unit side connecting terminals 27a,27b, or one construction shown in FIGS. 9 and 10 enables preventing looseness of the fixing screw 34.

Figure 11:
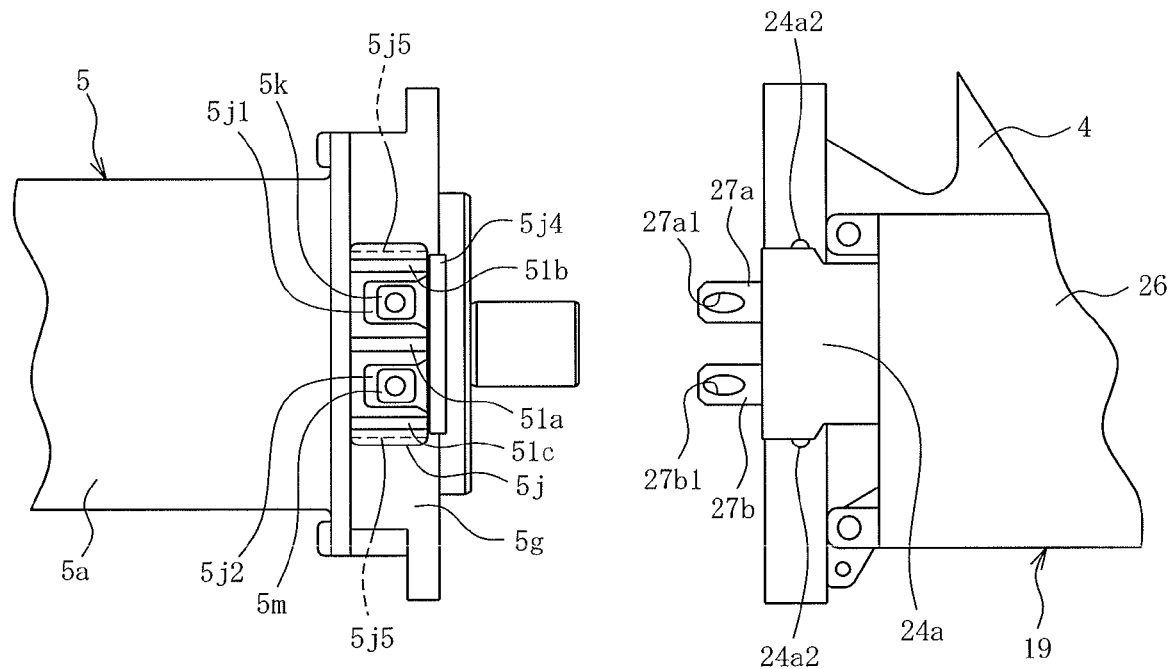
FIG. 11 is a view showing a third embodiment according to the present invention.

Further, FIGS. 11 and 2 show a fourth embodiment according to the present embodiment.

As shown in FIG. 11, on the upper surface of the terminal block 5j, a solder splash preventing wall 51a is provided upwardly protrudingly at a position partitioning the motor side connecting terminals 5k,5m, a solder splash preventing wall 51b is provided protrudingly at an opposite side of the solder splash preventing wall 51a, putting the motor side connecting terminal 5k therebetween, and a solder splash preventing wall 51c is provided protrudingly at an opposite side of the solder splash preventing wall 51a, putting the motor side connecting terminal 5m therebetween.

Figure 12:
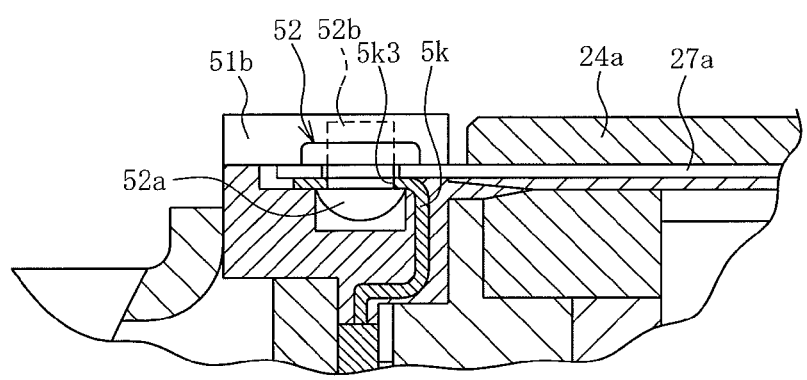
FIG. 12 is a view showing a connecting state between a control unit and an electric motor of a fourth embodiment according to the present invention.

The preset embodiment, as shown in FIG. 12, the motor side connecting terminal 5k and the unit side connecting terminal 27a are connected by solder welding.

Namely, a shank 52b of a welding rivet 52 is inserted from the bottom into a through hole of the overlapped unit side connecting terminal 27a and the motor side connecting terminal 5k so that a head 52a abuts to a lower surface of the motor side connecting terminal 5k. The shank 52b upwardly protruding from an upper surface of the unit side connecting terminal 27a is connected by resistance welding or spot welding with a welding tool arranged from a direction vertical to a shaft line of the electric motor 5. In passing, although not shown, the motor side connecting terminal 5m and the unit side connecting terminal 27b have the same construction and are soldered by welding.

In the present embodiment, a welded portion between the motor side connecting terminal 5k and the unit side connecting terminal 27a are surrounded by the solder splash preventing walls 51a,51b, and a welded portion between the motor side connecting terminal 5m and the unit side connecting terminal 27b is also surrounded by the solder splash preventing walls 51a,51c. Thus, it is very unlikely that solder penetrates between the motor side connecting terminals 5k,5m, and that solder splash to another portion.

A solder welding operation is carried out by disposing a welding tool from a direction vertical to a shaft line of the overlapped unit side connecting terminal 27a and the motor side connecting terminal 5k, and unit side connecting terminal 27b and the motor side connecting terminal 5m. Hence, it enables taking up an ample rule space due to the absence of member interfering with the solder tool, which improves solder workability.

Although a thrust force is applied to the unit side connecting terminal 27a and the motor side connecting terminal 5k, and the unit side connecting terminal 27b and the motor side connecting terminal 5m to be soldered, the speed reduction gear box 4 is subject to the thrust force instead thereof. Consequently, it enables prevention of suffering from breakage to the motor side connecting terminals 5k,5m and the unit side connecting terminals 27a,27b during a connecting work.

Whereas in the aforementioned present embodiment, an explanation was made to the case where the present invention is applied to a right-hand drive car, not limited thereto, where the present invention is applied to a left-hand drive car, it has only to arrange the electric motor 5 and the control unit 19 at the right of plane symmetry, putting a vertical plane therebetween, running along a control axis of the steering column 3.

INDUSTRIAL APPLICABILITY

As discussed in the above, the electric power steering apparatus according to the present invention is serviceable to connect the motor side connecting terminals and the unit side connecting terminals, while reducing a motor operating sound, even if the electric motor with brash having the floating construction.

REFERENCE SIGNS LIST

1: electric power steering apparatus
2: steering shaft
2a: input shaft
2b: torsion bar
2c: output shaft
3: steering column
4: speed reduction gear box
4b: support
5: electric motor
5a: yoke
5b: magnet
5c: shaft
5d: armature
5e: commuter
5f: brash
5g: flange member
5h: screw
5i: brash holder
5j: terminal block
5j1,5j2: terminal block surface
5j3: guide wall
5j4: positioning convex
5j5: engage groove
5k,5m: motor side connecting terminal
5k1: bent portion
5k1,5k2: point
6: upper mounting bracket
7: lower mounting bracket
11: worm
12: worm housing
13: worm wheel
14: worm wheel housing
15: torque sensor
15a: detection coil
15a,15b: detection coil
15c to 15f: external connecting terminal
16: torque sensor housing
17: motor mounting part
187: column mounting part
19: control unit
20: control unit mounting part
21: heat discharging plate
22a: connecting terminal
23: power substrate
24: synthetic resin frame
24a: terminal holder
24a1: positioning recess
24a2: engage projection
25: control substrate
25e: discrete parts
26: cover
27a,27b: unit side connecting terminal
27a1,27b1: slot-shaped screw hole
28: screw insertion hole
29: metal collar
30: gum mount
32: gum sheet
34: fixing screw
35: terminal cover
35a: engage convex
45: female connector
45a: power connector
45b: signal connector
50: fixing screw
51a,51b,51c: solder splash preventing wall
52a: solder rivet
52a: head
52b: shank
60: universal joint
61: lower shaft
62: universal joint

The invention claimed is:

1. An electric power steering apparatus comprising a steering column in which a steering shaft through which steering torque is transmitted is installed, and an electric motor to transmit via a speed reducer in a speed reduction gear box a steering assist force to the steering shaft, wherein
the electric motor and a control unit to drive the electric motor are juxtaposed in the speed reduction gear box;
a terminal block is provided at an outer circumference of a flange proximate to the control unit of the electric motor, a terminal box surface of the terminal block being provided so that a plane direction faces a direction vertical to an axis line of the electric motor, the motor side connecting terminal of the electric terminal being held on the terminal block surface;
the unit side connecting terminal provided at a position proximate to the electric motor of the control unit is arranged so as to overlap with the motor side connecting terminal on the terminal block surface; and
the unit side connecting terminal and the motor side connecting terminal are coupled at a coupling portion,
wherein the motor side connecting terminal is provided with a bent portion at a side proximate to the control unit, and,
wherein the motor side connecting terminal is provided with a rising slope so as to apart from the terminal block surface, imparts an elastic backlash to the unit side connecting terminal as the motor side connecting terminal goes from the bent portion toward a terminal tip.

2. The electric power steering apparatus according to claim 1, wherein the motor electric motor and the control unit are arranged on the speed reduction gear box in series in an axial direction of the electric motor.

3. The electric power steering apparatus according to claim 1, wherein the coupling portion couples the unit side connecting terminal and the motor side connecting terminal from an axial direction of the steering column.

4. The electric power steering apparatus according to claim 1, wherein the coupling portion is a fixing screw for fastening to the terminal block together with unit side connecting terminal and the motor side connecting terminal from a direction vertical to a shaft line of the electric motor.

5. The electric power steering apparatus according to claim 4, further comprising a speed reduction gear box fixing screw to fix the control unit to the speed reduction gear box, the speed reduction gear box fixing screw extending in the same direction as the fixing screw to be mashed with the unit side connecting terminal.

6. The electric power steering apparatus according to claim 1, wherein the coupling portion is solder welding to bond the unit side connecting terminal and the motor side connecting terminal to the terminal block.

7. The electric power steering apparatus according to claim 6, wherein a set of the overlapped unit side connecting terminal and the motor side connecting terminal is arranged multiple adjacent to one another, and a solder splash preventing wall to prevent splash of solder is provided between the adjacent set.

8. The electric power steering apparatus according to claim 1, wherein a terminal holder holding the unit side connecting terminal is provided at a position proximate to the electric motor of the control unit, one fixing concave and convex being provided at a position facing the electric motor of the terminal holder;

the other fixing concave and convex are provided on the terminal block of the electric motor proximate to the terminal holder; and when the one fixing concave and fixing convex of the terminal holder and the other fixing concave and convex of the terminal block are engaged, the unit side connecting terminal overlaps with the motor side connecting terminal.

9. The electric power steering apparatus according to claim 1, wherein a guide wall is provided on the terminal block to guide the unit side connecting terminal in a direction in which the unit side connecting terminal overlaps with the top of the motor side connecting terminal.

10. The electric power steering apparatus according to claim 1, wherein a terminal cover covering around the unit side connecting terminal and the motor side connecting terminal is detachably provided on the terminal block.

11. The electric power steering apparatus according to claim 10, wherein the terminal cover slidably moves, while being engaged with the terminal block, to a position covering around the unit side connecting terminal and the motor side connecting terminal from an outer circumference of the electric motor apart from the control unit.

* * * * *